United States Patent [19]

Maekawa et al.

[11] Patent Number: 4,728,198
[45] Date of Patent: Mar. 1, 1988

[54] KNEADER

[75] Inventors: Hideya Maekawa, Tokai; Hifuo Noiri, Hashima, both of Japan

[73] Assignee: NGK Insulators, Ltd., Aichi, Japan

[21] Appl. No.: 900,392

[22] Filed: Aug. 26, 1986

[30] Foreign Application Priority Data

Sep. 3, 1985 [JP] Japan .......................... 60-133989[U]

[51] Int. Cl.⁴ .............................................. B01F 7/02
[52] U.S. Cl. ........................................ 366/279; 277/3; 366/99; 366/331
[58] Field of Search ................ 366/279, 97, 99, 64, 366/66, 297, 185, 187, 189, 331, 101, 102, 103, 104, 106, 107; 277/3

[56] References Cited

U.S. PATENT DOCUMENTS

| | | | |
|---|---|---|---|
| 2,193,934 | 3/1940 | Moores | 366/102 |
| 2,576,575 | 11/1951 | Collins | 366/99 |
| 3,643,964 | 2/1972 | Snelling | 366/102 |
| 3,752,446 | 8/1973 | Watanabe | 366/102 |
| 4,097,926 | 6/1978 | Face | 366/185 |

*Primary Examiner*—Robert W. Jenkins
*Attorney, Agent, or Firm*—Parkhurst & Oliff

[57] ABSTRACT

A kneader includes a vessel having an upper cover, at least one mixing blade provided in the vessel for mixing or kneading a powder material supplied in the vessel, sealing means for sealing between the vessel and ends of a shaft of the mixing blade extending through the vessel, bearings for supporting the shaft of the mixing blade on both the sides, blade driving means provided at one end of the shaft of the mixing blade. Each of the sealing means is provided on a side of the vessel with at least one air purge opening through which air is caused to flow toward the shaft of the mixing blade or into an interior of the vessel to form the sealing means as an air sealing construction, thereby completely preventing the powder material to be mixed from leaking through clearances between the vessel and the shaft by jetting air from the air sealing construction into the vessel.

3 Claims, 5 Drawing Figures

FIG_1
PRIOR ART
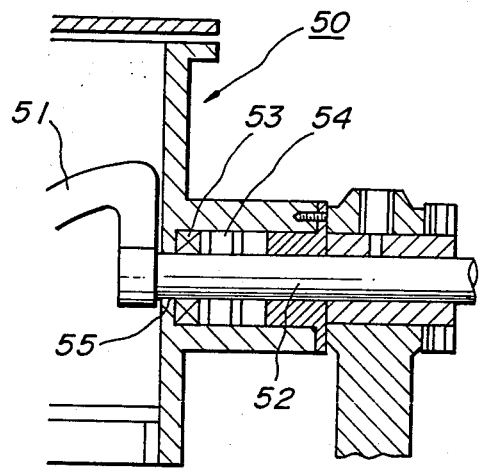

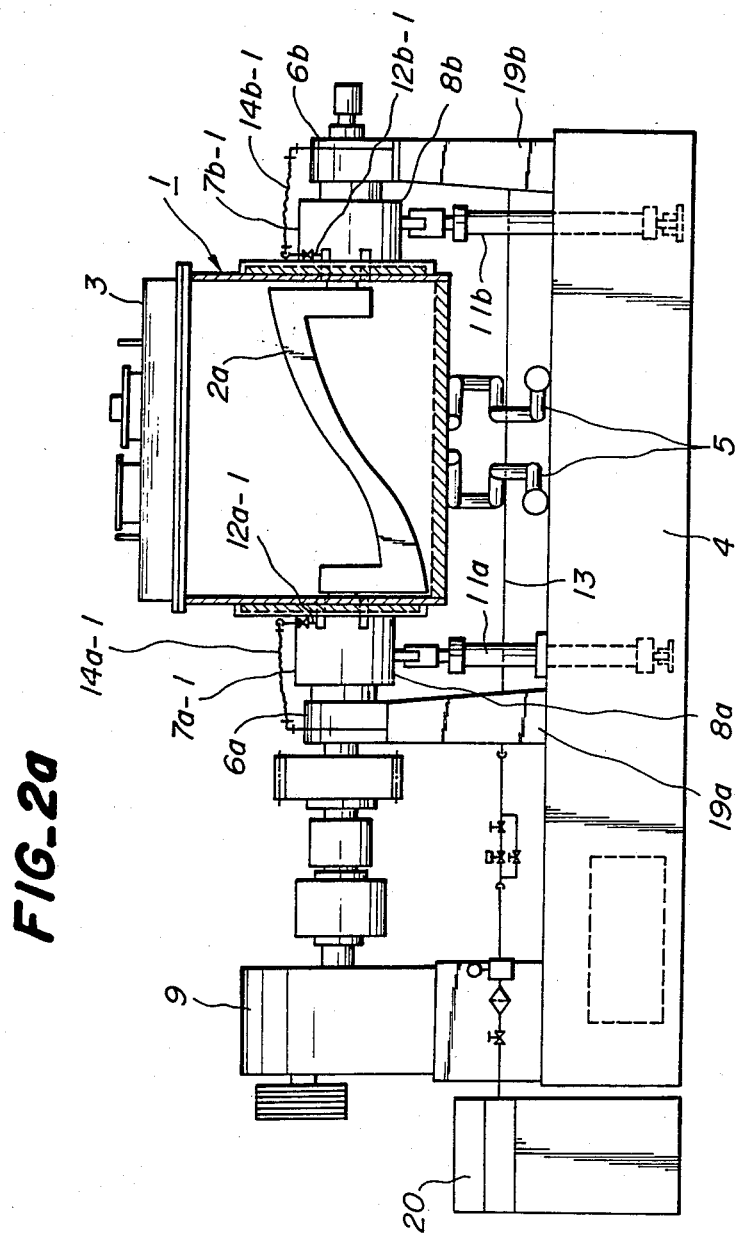
FIG_2a

FIG_2b
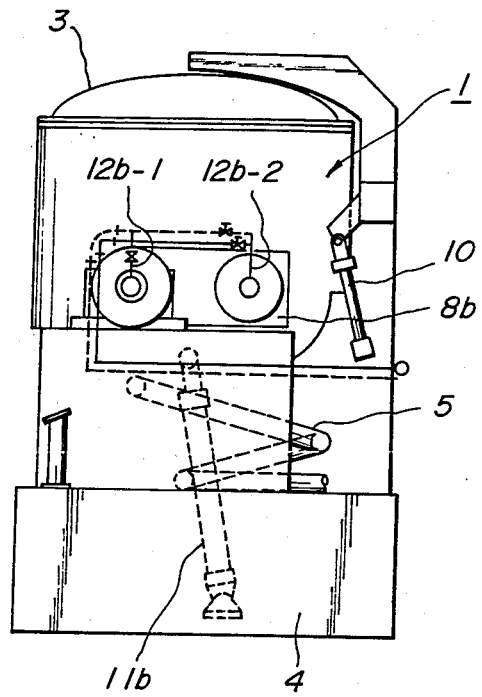

FIG_3
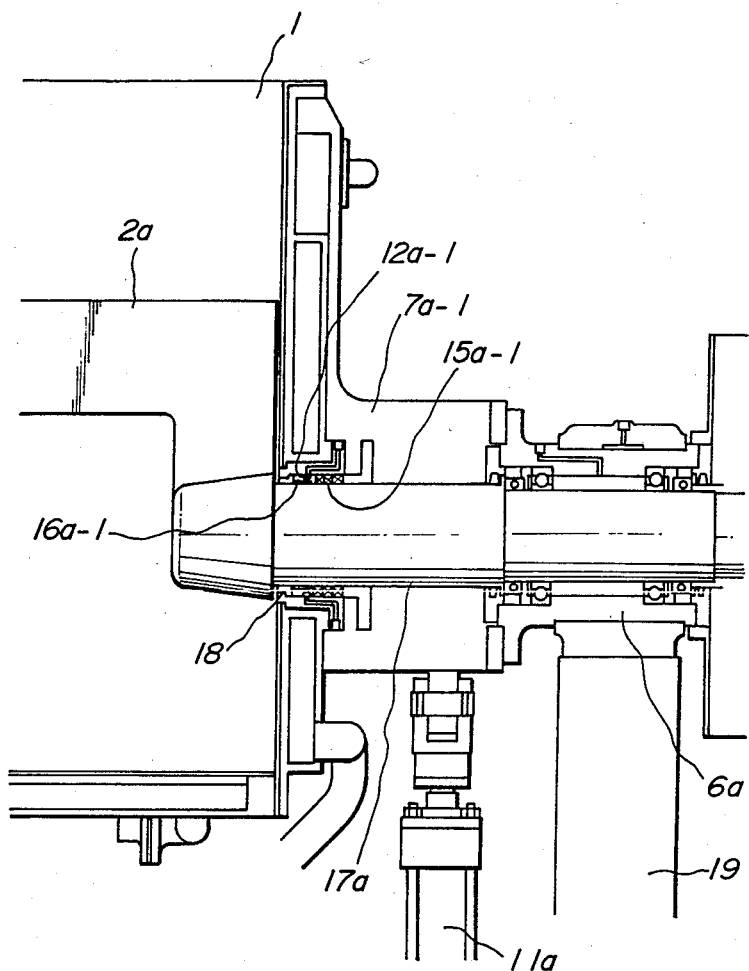

KNEADER

BACKGROUND OF THE INVENTION

This invention relates to a kneader for mixing or kneading powder materials for ceramics, powder metallurgy, chemical industry or the like and more particularly to a construction of seals for bearings of mixing blades for a kneader.

In hitherto used kneading apparatus as kneaders or the like, at least one mixing blade has been used for kneading powder materials supplied into a vessel. In order to prevent the powder material from escaping out of the apparatus, it has been required to provide a seal between the vessel and a shaft rotatively driving the mixing blade.

For this purpose, for example, a seal consisting of a gland packing 53 and/or an oil seal 54 is provided at a location where a vessel 50 contacts a shaft 52 for a mixing blade 51 to prevent a powder material from leaking through clearances 55 between the vessel 50 and the shaft 52 out of the kneader as shown in FIG. 1.

With such a sealing method, however, sealing materials of the gland packing 53 or the oil seal 54 tend to wear owing to sliding movements between the shaft 52 and the gland packing 53 or oil seal 54, so that part of the sealing materials are mixed with a powder material causing contamination. Moreover, part of the powder material flows through the clearances 55 into sealed portions, so that the powder material functions as abrasives to scrape or shave the shaft 52, resulting in metal components such as iron and the like of the shaft entering the vessel to contaminating the powder material.

Such components which may be mixed in the powder material are of a very small amount to an extent that it is unnoticeable by a normal chemical analysis. However, in the ceramic industry field, if the components, particularly the Fe component, is mixed in with the powder materials, there are often problems such as local change in color or tint of products of the powder material after sintering depending upon the kind of powder material. In general, powder materials of finer particles are apt to cause such a trouble of the local change in color. Therefore, it has been expected to develop a seal which does not cause such a contamination.

SUMMARY OF THE INVENTION

It is a primary object of the invention to provide an improved kneader which eliminates all the disadvantages of the prior art and completely prevents any contamination of a powder material.

In order to achieve the object, a kneader including a vessel in which a material is mixed, at least one mixing blade provided in said vessel for mixing the material supplied in said vessel, at least one sealing means for sealing a shaft of said mixing blade extending out of the vessel, and blade driving means for driving the shaft of said mixing blade are provided and according to the invention said sealing means is provided on a side of said vessel with at least one air purge opening through which air is caused to flow toward an interior of said vessel to form said sealing means as an air sealing construction.

With this arrangement, the sealing means for sealing the vessel and the ends of the shaft of the mixing blade are constructed by the air sealing construction, so that air always flows through clearances between the vessel and the shaft into the vessel. The material to be mixed is completely prevented from leaking through the clearances even if the grains of the material are less than 0.1 μm. As any sealing material to be worn is not used, mixing part of the sealing material or metal due to wear into the power material is completely prevented. Moreover, the air jetted from the air purge opening would aid the mixture of the powder material.

In a preferred embodiment of the invention, the sealing means comprises at least one gland seal or at least one oil seal externally of the air sealing construction.

In order that the invention may be more clearly understood, preferred embodiments will be described, by way of example, with reference to the accompanying drawings.

BRIEF DESCRIPTION OF THE DRAWINGS

FIG. 1 is a schematic view for explaining a sealing construction of the prior art;

FIG. 2a is an elevational view partly in section illustrating one embodiment of a kneader according to the invention;

FIG. 2b is a side view of the kneader shown in FIG. 2a;

FIG. 3 is an enlarged view for explaining an air sealing construction according to the invention.

DESCRIPTION OF THE PREFERRED EMBODIMENTS

Figure 4:
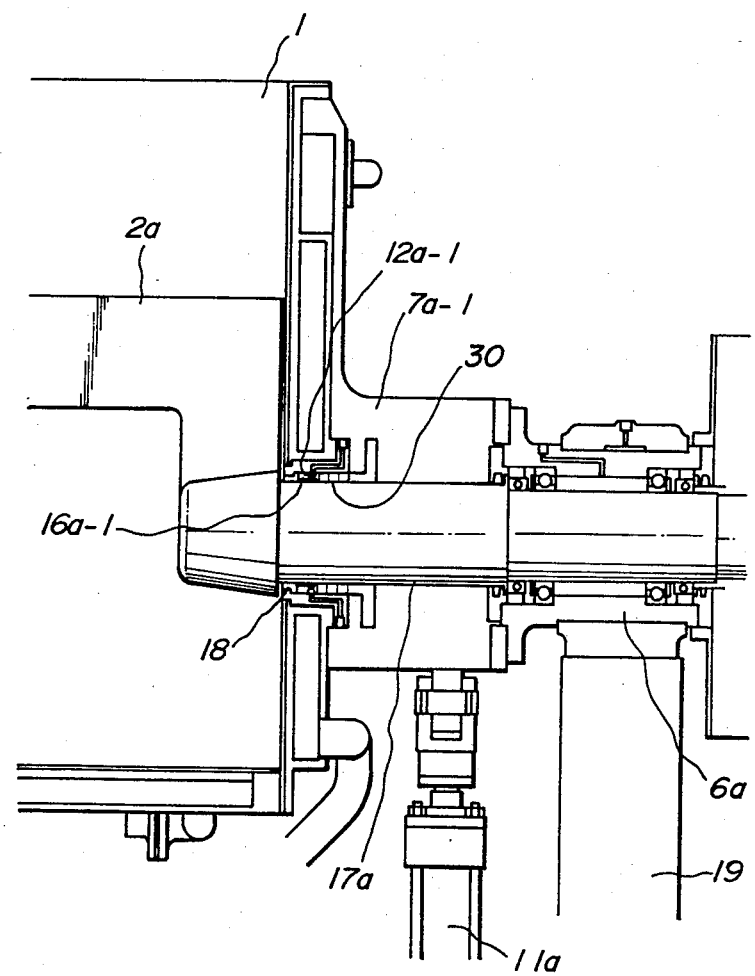
FIG. 4 is an enlarged view of explaining another embodiment of the inventive air sealing construction.

FIGS. 2a and 2b are a plan and a side view illustrating in partial sections one embodiment of the kneader according to the invention. In this embodiment, a vessel 1 having two mixing blades 2a and 2b is provided at an upper portion with an upper cover 3 adapted to be closed and opened by a hydraulic cylinder 10, and at a lower portion with extensible and contractable piping 5 for a heat medium arranged on a base 4. The vessel 1 is provided in two side surfaces with two apertures, respectively, for passing shafts of the mixing blades 2a and 2b therethrough, so that ends of the shafts of the mixing blades 2a and 2b extend through the apertures and are supported in bearings 6a and 6b arranged on bearing supports 19a and 19b on the base 4. Between the bearings 6a and 6b and the vessel 1 are arranged sealing means 7a-1, 7b-1 and 7a-2, 7b-2 adjacent to the vessel 1 for sealing between the vessel 1 and the shafts of the mixing blades 2a and 2b. Blade driving mechanisms 8a and 8b are provided between the sealing means 7a-1 and 7a-2 and between sealing means 7b-1 and 7b-2 so that only the one mixing blade 2a is driven through the sealing means 7a-1 and the bearing 6a-1 by a motor 9 provided on the base 4 to cause the mixing blades 2a and 2b to rotate simultaneously.

Hydraulic cylinders 11a and 11b are provided on the base 4 below the sealing means 7a-2 and 7b-2 not associated with driving shafts driven by the motor 9 to remove the kneaded material from the vessel 1. Air purge openings 12a-1, 12b-1, 12a-2 and 12b-2 are provided on the sealing means 7a-1, 7b-1, 7a-2 and 7b-2 and are connected to each other through an air supply tube 13 and movable tubes 14a-1, 14b-1, 14a-2 and 14b-2 to form air sealing constructions. The air supply tube 13 is connected to an air supply source 20, for example, air compressor.

FIG. 3 is an enlarged view of the sealing means 7a-1 for explaining the air seal construction according to the invention. In FIG. 3, like components have been designated by the same reference numerals as those used in FIG. 2 and will not be described in further detail.

In the embodiment shown in FIG. 3, in addition to air sealing construction by two air purge openings respectively provided at upper and lower portions, there are provided gland seals 15a-1 externally thereof shown in FIG. 3. This air sealing is accomplished by causing air flow directing into a vessel through a clearance 18 between a shaft 17a of a mixing blade 2a and the vessel 1 by supplying air of the order of about 0.5–1.0 kg/mm$^2$ from the air purge openings 12a-1 to notches 16a-1 formed in a circumference correspondingly to the air purge openings. As this embodiments, by providing both the air sealing and gland seals, the air flow can be directed only into the vessel 1, so that a powder material in the vessel 1 is effectively prevented from leaking out of the vessel 1.

The air sealing construction naturally forms an air sealing space therein. In the above embodiment, the air forced into the air sealing space has been explained. However, the air sealing space may be maintained at higher pressure than the vessel 1, in order to prevent the powder material from invading the air sealing space.

The operation of the kneader according to the invention for kneading a powder material will be explained by way of example.

First, the hydraulic cylinder 10 is actuated to open the upper cover 3 and a powder material is supplied into the vessel 1. The supplied amount of the powder material is assumed as 660 kg per one batch. The upper cover 3 is then closed and the motor 9 is energized to rotate the mixing blades 2a and 2b at the same speed of 21 r.p.m. The kneading continues under dried conditions for ten minutes in order to uniformly mix the powder material and a binder and the like, and then under wet conditions with supplied water for twenty minutes. During the above kneading, air of 0.5–1.0 kg/mm$^2$ is continuously supplied through the air purge openings 12a-1, 12a-2, 12b-1 and 12b-2. After kneading, the upper cover 3 is again opened by means of the hydraulic cylinder 10, and keeping the upper cover 3 opened, the hydraulic cylinders 11a and 11b are actuated to turn the vessel 1 through 110° about the sealing means 7a-1 and 7b-1 through which a driving shaft is extended to discharge the powder material onto a container car in order to transport it to a required location.

The present invention is not limited to the above embodiments and various changes and modifications may be made in the invention. For example, oil seals 30 (FIG. 4) may be substituted for gland seals 15a-1. Also, although solid blades as the mixing blades have been explained as used in the embodiments, pipe lines may be provided in the mixing blades along their longitudinal directions through which a cooling or heating medium is caused to flow for cooling or heating the powder material. In this manner, when, for example, a thermosetting resin or the like is used as a binder, more effective kneading can be performed. Moreover, the number of the mixing blades is not limited to those of the embodiments.

As can be seen from the above detailed explanation, the kneader according to the invention comprises sealing means constructed by air sealing to effectively prevent the powder material from leaking through clearances between the vessel and the shafts of the mixing blades, and further to effectively prevent the contamination of the powder material due to mixing with sealing materials or metals produced by wearing.

What is claimed is:

1. A kneader including a vessel in which a material is mixed, at least one mixing blade provided in said vessel for mixing the material supplied in said vessel, at least one sealing means for sealing a shaft of said mixing blade extending out of the vessel, and blade driving means for driving the shaft of said mixing blade, wherein said sealing means is provided on the side of said vessel with at least one air purge opening along the periphery of said shaft, and an air supply source connected to said opening through which air is caused to flow toward an interior of said vessel to form said sealing means as an air sealing construction.

2. A kneader as set forth in claim 1, wherein said sealing means comprises at least one gland seal externally of said air sealing construction.

3. A kneader as set forth in claim 1, wherein said sealing means comprises at least one oil seal externally of said air sealing construction.

* * * * *